US012239262B2

(12) United States Patent
Giannopoulos

(10) Patent No.: US 12,239,262 B2
(45) Date of Patent: Mar. 4, 2025

(54) DEVICE FOR THE DELIVERY OF PRODUCTS PROCESSED FROM FRESH FRUITS AND/OR VEGETABLES

(71) Applicant: Panagiotis Giannopoulos, Attikis (GR)

(72) Inventor: Panagiotis Giannopoulos, Attikis (GR)

(*) Notice: Subject to any disclaimer, the term of this patent is extended or adjusted under 35 U.S.C. 154(b) by 754 days.

(21) Appl. No.: 17/604,292

(22) PCT Filed: Apr. 16, 2019

(86) PCT No.: PCT/GR2019/000030
§ 371 (c)(1),
(2) Date: Oct. 15, 2021

(87) PCT Pub. No.: WO2020/212716
PCT Pub. Date: Oct. 22, 2020

(65) Prior Publication Data
US 2022/0192427 A1    Jun. 23, 2022

(51) Int. Cl.
*A47J 44/00*      (2006.01)
*A23L 5/10*      (2016.01)
(Continued)

(52) U.S. Cl.
CPC .............. *A47J 44/00* (2013.01); *A23L 5/13* (2016.08); *A23N 1/00* (2013.01); *A23N 7/00* (2013.01);
(Continued)

(58) Field of Classification Search
CPC . A23N 1/00; A23N 15/02; A23N 1/02; A23N 12/02; A23N 15/003; A23N 15/06;
(Continued)

(56) References Cited

U.S. PATENT DOCUMENTS 2,181,514 A * 11/1939 Lachman ................. A23B 7/08
                                                                                 426/616
2,455,382 A * 12/1948 Nelson ................ C08B 37/0045
                                                                                 426/333
(Continued)

FOREIGN PATENT DOCUMENTS

CN       105632038 A      6/2016
CN       106723095 A      5/2017
(Continued)

OTHER PUBLICATIONS

First Office Action received in CN Application No. 201980097578. 4, mailed on Jan. 19, 2023, pp. 28.
(Continued)

Primary Examiner — Chris Q Liu
(74) Attorney, Agent, or Firm — Gearhart Law, LLC

(57) ABSTRACT

A device adapted to deliver fruit and/or vegetable juices, pulps, salads and composts, etc., each fruit or vegetable being selectively served raw or cooked, with a scope to obtain maximal nutritional intake. The device comprises a housing and a transparent showcase accommodating an ample variety of fruits and vegetables, equipment for the preparation of the above fruit/vegetable products including at least one juicer appliance and one blender appliance for alternatively preparing fruit/vegetable juice and pulp respectively delivered through downwardly inclined pipe members into a container within product delivery compartments and equipment for cleaning the juicer and blender appliances and corresponding pipe members in between sequential fruit/vegetable servings, comprising an autonomous circuitry and container of cleaning water supply and container for collection of sewerage. The device also comprises a kettle for cooking selected fruits/vegetables, an unpeeling device and cutting device.

7 Claims, 8 Drawing Sheets

(51) Int. Cl.
| | |
|---|---|
| *A23N 1/00* | (2006.01) |
| *A23N 7/00* | (2006.01) |
| *A47F 3/02* | (2006.01) |
| *A47F 3/04* | (2006.01) |
| *A47J 17/14* | (2006.01) |
| *A47J 19/00* | (2006.01) |
| *A47J 43/04* | (2006.01) |
| *B08B 3/14* | (2006.01) |
| *B08B 9/032* | (2006.01) |

(52) U.S. Cl.
CPC ............. *A47F 3/02* (2013.01); *A47F 3/0434* (2013.01); *A47J 17/14* (2013.01); *A47J 19/00* (2013.01); *A47J 43/04* (2013.01); *B08B 3/14* (2013.01); *B08B 9/0321* (2013.01); *A23V 2002/00* (2013.01); *B08B 2203/007* (2013.01); *B08B 2209/032* (2013.01)

(58) Field of Classification Search
CPC .......... A23N 15/04; A23N 15/12; A23N 7/00; A23N 7/02
USPC ...... 99/537, 567, 584, 334, 357, 450.4, 451, 99/484, 486, 491, 630, 635, 637, 640, 99/643; 83/13, 177, 932, 365, 367, 368, 83/53, 72, 75.5, 77
See application file for complete search history.

(56) References Cited

U.S. PATENT DOCUMENTS

| | | | | |
|---|---|---|---|---|
| 4,294,861 | A * | 10/1981 | Ifuku | A23L 2/06 426/489 |
| 4,581,632 | A * | 4/1986 | Davis | G01N 21/88 250/559.47 |
| 4,831,922 | A * | 5/1989 | Cogan | B07C 5/3422 356/625 |
| 5,025,716 | A * | 6/1991 | Inagaki | A23B 4/08 134/200 |
| 5,544,572 | A * | 8/1996 | Garmendia | A23N 1/003 99/489 |
| 9,091,673 | B2 * | 7/2015 | Fern | A22B 5/0041 |
| 2003/0056627 | A1 * | 3/2003 | Hubert | A23N 15/003 83/13 |
| 2008/0086374 | A1 * | 4/2008 | Aitken | G06Q 30/02 705/14.27 |
| 2008/0289515 | A1 * | 11/2008 | Knorr | G01N 21/85 460/134 |
| 2017/0325482 | A1 * | 11/2017 | Deng | G07F 13/10 |
| 2018/0033056 | A1 | 11/2018 | Sakhno | |
| 2018/0330566 | A1 * | 11/2018 | Sakhno | A23L 2/04 |
| 2019/0000025 | A1 | 1/2019 | De Guero et al. | |
| 2019/0000259 | A1 * | 1/2019 | De Guero | A23N 1/02 |
| 2019/0006972 | A1 | 3/2019 | Alfarra | |
| 2019/0069728 | A1 * | 3/2019 | Alfarra | A23N 12/02 |
| 2019/0125126 | A1 * | 5/2019 | Cohen | G07F 17/0064 |

FOREIGN PATENT DOCUMENTS

| | | |
|---|---|---|
| RU | 2141779 C1 | 11/1999 |
| WO | 2007091265 A2 | 8/2007 |
| WO | 2014114960 A1 | 7/2014 |
| WO | 2020212716 A1 | 10/2020 |

OTHER PUBLICATIONS

Decision on Grant received in RU Application No. 2022102862, mailed on Oct. 6, 2022, pp. 18.

Examination Search Report received in CA Application No. 3146989, mailed on Jan. 31, 2023, pp. 5.

* cited by examiner

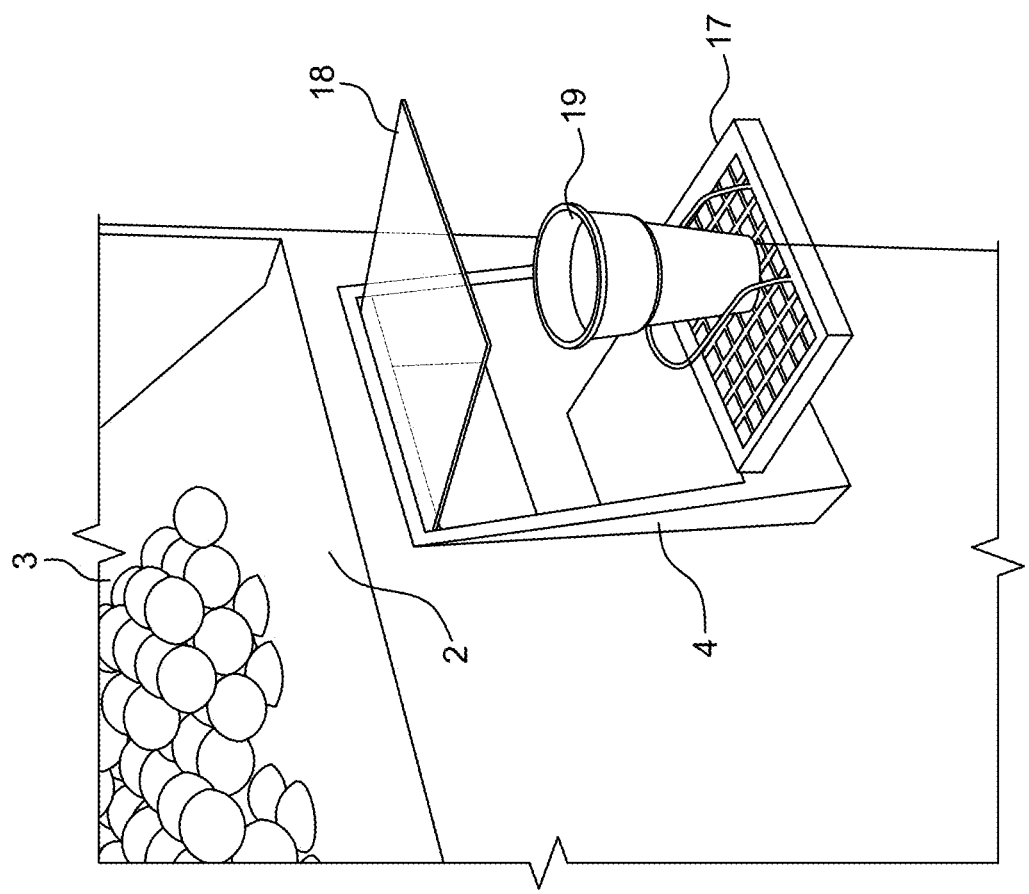
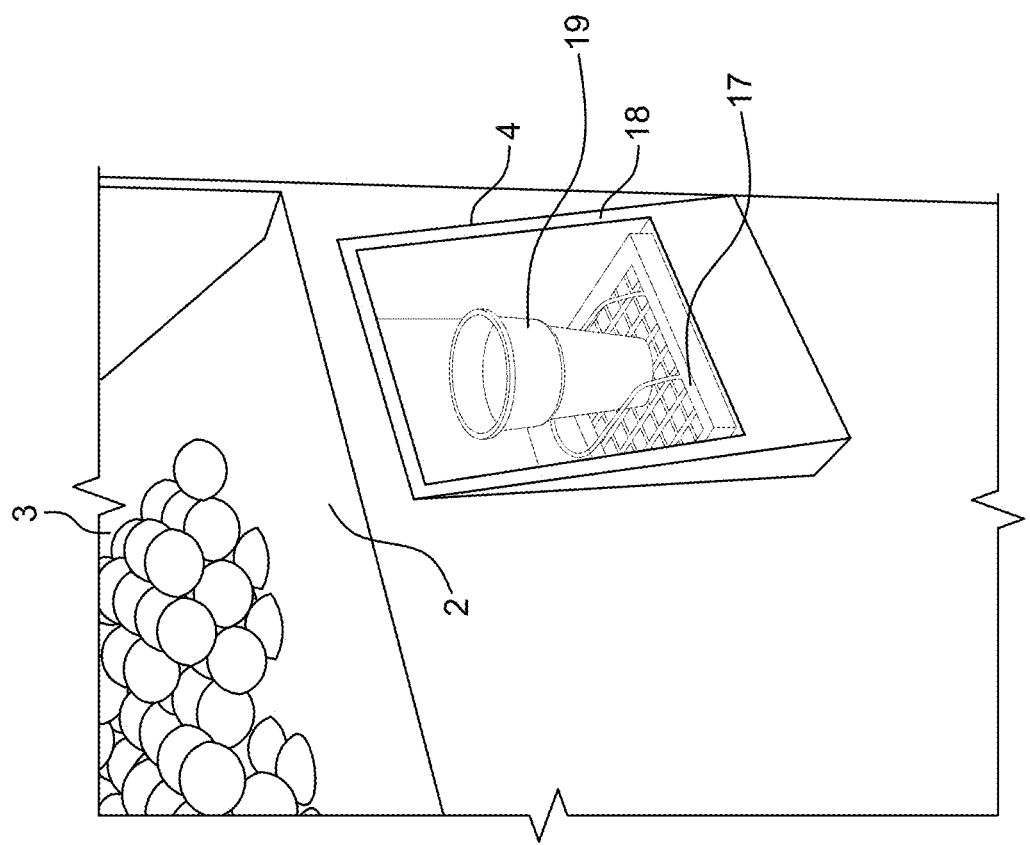

DEVICE FOR THE DELIVERY OF PRODUCTS PROCESSED FROM FRESH FRUITS AND/OR VEGETABLES

CROSS REFERENCE TO RELATED APPLICATION

This application is a national stage application of PCT-application number PCT/GR2019/000030 filed on Apr. 16, 2019 the disclosures of which is incorporated herein by reference.

THE FIELD OF THE ART

The invention relates to the field of devices adapted to prepare and provide consumable products prepared from fresh fruits and/or vegetables. The device of the invention is adapted to deliver fruit and/or vegetable juices, pulps, salads and composts, each fruit or vegetable component of these deliverable products being selectively served raw or cooked, cold or hot, with a scope to obtain maximal nutritional intake and be compatible with customer requirements.

THE BACKGROUND OF THE INVENTION

A variety of devices are known in the prior art adapted to prepare and provide products resulting from processing of fruits or vegetables, such as juicers, blenders and the like, as well as automatic juice vending machines. None of the devices of the prior art is capable of delivery of the variety of fruit and/or vegetable products of the device of the present invention that is adapted to deliver fruit and/or vegetable juices, pulps, salads and composts, etc. with each fruit or vegetable component of these deliverable products being selectively served raw or cooked, cold or hot, with a scope to obtain maximal nutritional intake and be compatible with customer requirements.

The nutritional value of fruits and vegetables is broadly acknowledged as promoting good health, anti-ageing and longevity. Many nutritionists encourage people to consume plenty of fruit and vegetables, five or more portions a day often being recommended. It is for this reason that recent years have seen a wide spread operation of shops that sell juices of fruits and vegetables. Furthermore a variety of automatic vending machines has been developed that provides juices extracted from fresh fruits.

Whilst there is a vast variety of fruits and vegetables that can be advantageously consumed, a customer of such juice selling stores is only offered a limited choice of juices containing a few most commonly available fruits and vegetables. Choice is further limited due to the customer not being provided with a visually conceivable showcase of available fruits and vegetables to choose from. Moreover automatic vending machines are necessarily limited in serving fruits of a specific shape, texture and size, preferably a round shape adapted to handily roll down a predetermined channel to be guided at a juicer device that would dispense a juice product into a cup for the customer to consume and they are not adapted to process fruits and vegetables of irregular varying shapes, textures and sizes. By way of example, if adapted to process oranges, automatic vending machines would be capable of additionally or alternatively processing apples or tomatoes, but they would be incapable of processing substantially larger fruit, such as pineapples or substantially smaller fruits, such as grapes or strawberries. Furthermore, they would be incapable of processing fruits and vegetables of distinct irregular shapes and varying texture, such as carrots or pumpkin or broccoli. Finally, having been designed to provide juices, automatic vending machines do provide juices only of the fruits being processed and they cannot alternately provide a pulp of the fruit normally necessitating a blender device instead of a juicer and even if they may be capable to deliver fruit salads and composts containing fruit particles, which are either contained in prepackaged servings or served from a container loaded with prepared fruit salad or compost ingredients, they cannot provide fruit salads and composts prepared from fresh fruit at the time of receipt of an order by a customer.

A further important deficiency of the prior art is that neither fruit and vegetable juice providing stores, nor automatic vending machines of this kind can provide a product of cooked fruit and/or vegetable. In this respect, it is noted that vegetables can be eaten either raw or cooked and play an important role in human nutrition, being mostly low in fat and carbohydrates, but high in vitamins, minerals and dietary fiber. Fruits might also be preferably consumed cooked, especially with a scope of providing an enhanced digestibility thereof and this is the reason of people suffering from diseases related to the gastrointestinal system preferring cooked vegetables and fruits and of hospitals mainly serving fruit composts instead of raw fruit.

Moreover, it is noted that the mode of preparation of fruit and vegetable products makes a big difference in the nutritional punch they pack. The right mode of cooking can bring out the nutrients in some, whereas others must be eaten raw to get the biggest benefit. By way of example, cooking fresh, diced tomatoes enhances intake and use of lycopene content thereof, i.e. of the natural chemical that is considered to provide a defense against heart disease and some types of cancer. Cooking also enhances intake of carotenoids and nutritional value of carrots and steaming broccoli advantageously softens it, whilst letting it hold most of the valuable glucosinolate compound thereof. Quick cooking can also raise the amount of antioxidants contained in some types of mushrooms. Asparagus is another vegetable that should be cooked, since cooking can break down the fibre, making it easier to digest and increases absorption of vital nutrients and antioxidants like vitamins A, B, C, E, and K. Cooked vegetables can also provide more minerals. In spinach, heating releases bound calcium, thereby providing an enhanced quantity thereof for the body to absorb, the difference being significant since cooked spinach has 245 mg/cup of calcium, while raw spinach only has 30 mg/cup. However, whilst on the one hand, cooking spinach boosts its antioxidant content, on the other hand, the polyphenol content thereof is prone to degradation when cooked. It therefore follows that consuming raw or cooked spinach depends on the nutrient one is eager to intake.

The above clearly shows that the maintenance and rendering of the maximum vitamin and nutritional content is related to consumption of varying fruits and vegetables at a raw or cooked condition. It has in particular been established that an increase of some vitamins, minerals, antioxidants, phytochemicals and enzymes is obtained by cooking or heating certain vegetables containing the same rather than consuming them at raw condition. Notably, there is some evidence suggesting that cooked foods contributed to the evolution of the human brain because cooking "greatly increases the caloric yield of the diet, as a result of the greater ease of chewing, digestion, and absorption of foods." Finally, it is expected that whilst consumption of cool fruit/vegetable juices is preferred in summertime and warm weather, hot servings of vegetables and/or fruits might be preferred in winter and cold weather conditions.

It is particularly important to note that a well balanced intake of the plurality of vitamins and nutrients cannot be achieved through consumption of a limited variety of fruits and vegetables, since each fruit and vegetable species can provide a different mix of vitamins and nutrients and thus it can be achieved only by consuming a large variety of fruits and vegetables and the object of the device of the present invention is to provide juice, pulp or particles of such necessary ample variety of fruits and vegetables.

Furthermore, it is evident from the above that neither fruit and vegetable juice preparing and serving stores, nor automatic vending machines of the prior art can provide the variety of different choices of alternately raw or cooked fruits and/or vegetables and of alternately providing selected servings of fruit/vegetable juice or pulp or fruit/vegetable salad or compost, such different alternative choices being important in maximizing the vitamin and nutrient intake from their consumption.

It is therefore the object of the invention to provide a device comprising the equipment for preparing and serving fruit and/or vegetable products including juices, pulps, salads, composts, each vegetable and/or fruit being served either raw or cooked, the device further comprising a refrigerated showcase whereupon an ample variety of fruits and vegetables available for serving is being displayed, the device thereby providing a possibility for each customer to order and be served with a desired mixture of fruits and vegetables with a required nutritional content, such mixture being served as an alternately desired, cooked or raw, juice, pulp, salad or compost product.

Due to the varying nature of fruits and vegetables being processed in the juicer or blender devices provided in stores or in automatic vending machines, it is necessary to effect a thorough cleaning of the juicer or blender devices and piping used to discharge their juice or pulp product into containers appropriate for their consumption after processing each portion of fruit/vegetable juice product being ordered. Due to provision of a single type of fruit, e.g. oranges in an automatic vending machine or the provision of a restricted variety of related fruits/vegetables, e.g. oranges and grapefruits in stores, such a cleaning step maybe less important and is often being missed. Further, even when such cleaning a cleaning step is performed, devices of the prior art use water at ambient temperature that is relatively inefficient in removing odours, especially if a large variety of sequential servings is being used of fruits/vegetables with substantially different taste and odors. However, a step of efficient cleaning of the juicer or blender devices and associated piping is absolutely essential in the present invention wherein substantially differing fruit and vegetable species are being sequentially served.

It therefore is a further object of the present invention to provide an enhanced thorough cleaning of the fruit/vegetable processing equipment and of the piping provided for the delivery of a juice or pulp product into a glass or cup to be obtained by the customer using a cleaning process that provides the desired thorough cleaning and preferably using, at least periodically, a speed heater device that would provide heated water or even steam in order to provide a cleaning operation of enhanced efficiency.

It is further appreciated that the device is provided with at least one product delivery compartment that is hermetically closed by a frontal gate, adapted to receive a glass or cup or other container wherein the deliverable product is being served, the device being characterized in that a perforated platform of such compartment that is adapted to receive the container being filled with a juice or pulp product is provided with a weight detector that provides a first signal to stop supply of the juice or pulp product into the container following discharge therein of a product quantity in accordance with customer's order and open a frontal gate to provide the container filled with the juice or pulp product being ordered to the customer and a second signal to initiate closure of the frontal gate as soon as the customer removes the container.

Fruit and/or vegetable juice serving stores and juice providing vending machines of the prior art are merely equipped with the equipment necessary for the preparation and provision of the abovementioned fruit and vegetable juice or pulp products and in order to perform their function they further necessitate connection to the mains supply of electric power and water. It is therefore not possible to install and operate such devices of the prior art at locations that cannot provide such connections. However it is appreciated that the fruit/vegetable products of the device of the invention would enjoy an enhanced demand in many places that lack such electricity or water mains utilities, e.g. at the seaside or at short parking spaces provided along motorways, etc.

It is therefore a further object of the invention to provide the afore aforementioned device capable of operating for an extended period as an autonomous device without connection to power and/or water mains and in this regard the device can be provided with its own power source, be it a battery or photovoltaic panels or generator, the device being further provided with a sewerage collection container and a cleaning water container, wherein in accordance to a preferred embodiment cleaning water is continuously recycled having being cleaned from fruit or vegetable particle remains.

In conclusion the main object of the invention is to provide a device comprising the equipment for selecting, amongst an ample variety of fruits and vegetables that provides a full scale of vitamins and nutritional content, a fruit/vegetable mix and subsequently of preparing and serving fruit and/or vegetable products of such mix including juices, pulps, salads, composts, each vegetable and/or fruit being served either raw or cooked, and thereafter to provide, prior to a next serving of a fruit/vegetable mix, an enhanced thorough cleaning of the fruit/vegetable processing equipment and of the piping provided for the delivery of a juice or pulp product into a glass or cup or other container to be obtained by the customer.

The above and other characteristics and advantages of the present invention will be made apparent in the detailed description of preferred embodiments, which will be described hereinafter.

SUMMARY OF THE INVENTION

The hereinabove main object of the invention is being attained with a device for the delivery of products processed from fruits and/or vegetables, said device comprising a housing and a showcase located on top of the housing and made from a transparent material, said showcase accommodating a variety of fruits and vegetables, a compartment within said housing accommodating operational elements of the device including compressor equipment of a refrigerator appliance adapted to provide a cooled/refrigerated environment for said variety of fruits and vegetables within the showcase, said device characterized in that it comprises:

equipment for the preparation of products processed from fruits and/or vegetables including:

at least one juicer appliance and at least one blender appliance for alternatively preparing a juice and a pulp respectively of a selected fruit and/or vegetable mix and delivering the same through a first downwardly inclined pipe member from said juicer appliance and through a second downwardly inclined pipe member from said blender appliance into a container located within a juice or pulp product delivery compartment respectively;

a kettle with a colander that contains a selected fruit and/or vegetable mix and is immersed within said kettle adapted to cook said mix with a scope of enhancement of a nutritional value thereof;

at least one impeding device and at least one cutting device adapted to unpeel and cut a selected fruit and/or vegetable mix for preparing salad or compost servings thereof;

equipment for autonomous cleaning of said juicer appliance or said blender appliance and of respective juice and pulp delivery said downwardly inclined first and second pipe members thereof comprising:

a compartment of a container with cleaning water, a compartment of a container for the collection of sewerage;

a first water supply piping and a second water supply piping being provided to pump cleaning water through a pump from said compartment of the container with cleaning water to said juicer appliance or said blender appliance respectively and subsequently through said corresponding downwardly inclined first and second pipe members and thereof into said juice or said pulp product delivery compartment, and a first water discharge piping underlying said juice product delivery compartment and a second water discharge piping underlying said pulp product delivery compartment being respectively provided for a discharge of cleaning water flowing out of said juicer delivery compartment of said juicer appliance and out of said pulp delivery compartment of said blender appliance into said second compartment of the container for the collection of sewerage.

BRIEF DESCRIPTION OF THE DRAWINGS

The invention will be best understood by those skilled in the art by reference to the accompanying drawings in which:

FIGS. 8a and 8b present in perspective a detail respectively of the closed and opened compartment adapted to provide delivery of the fruit and/or vegetable juice or pulp product.

DESCRIPTION OF PREFERRED EMBODIMENTS OF THE INVENTION

The invention will be hereinafter described by reference to the illustrative embodiments presented in the accompanying drawings.

The invention discloses a device adapted to serve a desired mixture of fruits and vegetables with a required nutritional content, such mixture being served as an alternately desired, cooked or raw, cool or hot, juice or pulp, salad or compost product. The device mainly addresses professional applications, but it may also find domestic use as part of an amply spaced kitchen/living room or garden environment. Whilst, various, however complex and sophisticated, automations might be provided to allow operation of the device as an automatic vending machine or fruit/vegetable provider, in view of the ample variety of fruits and vegetables and the various modes of serving products prepared with the same, i.e. raw or cooked, juice or pulp or fruit/vegetable particles constituents of a fruit/vegetable salad or compost, the preparation of such servings using the device of the invention is preferably accomplished by at least one attendant, waiter or waitress.

Figure 1:
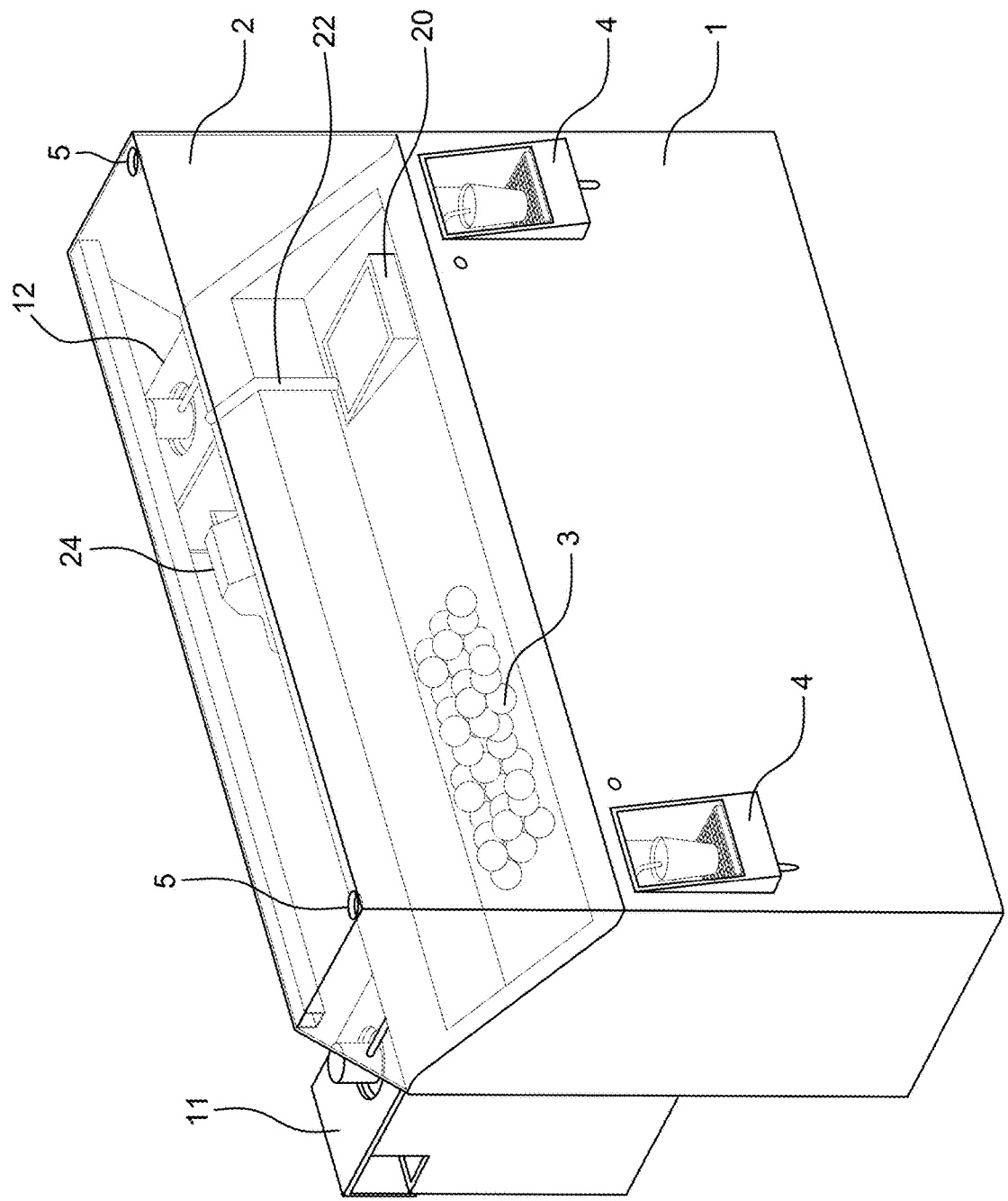
FIG. 1 shows in perspective a frontal view of the device in accordance with an illustrative embodiment of the invention.

The device depicted in the drawings and in FIG. 1 in particular comprises a housing 1 of a generally elongate rectangular configuration, but it may be offered in varying configurations, such as a curved configuration of a partial or whole circle or partial or whole ellipse or any combination of the above. Various operational elements of the device of the invention are accommodated within this housing 1, such operational elements and compartments housing the same being described hereinafter. The size of the device is such as to provide an ample space for accommodating and displaying a desired variety of fruits and vegetables to serve the needs of the present invention. The device further comprises a showcase 2 that is located on top of the housing 1 and extends all the way along the rectangular configuration thereof. The showcase 2 is made from glass or plastic or other suitable transparent material and the bottom thereof is preferably inclined to provide an optimal viewing mode for a customer approaching the device and wishing to select fruits and/or vegetables 3 being displayed for preparing a juice or pulp, salad or compost, etc. Since an ample variety of fruits/vegetables 3 is desired to be displayed and made available to customers, the showcase 2 might also be enlarged and include an additional elevated floor with a variety of fruit and/or vegetable exhibits.

Figure 6:
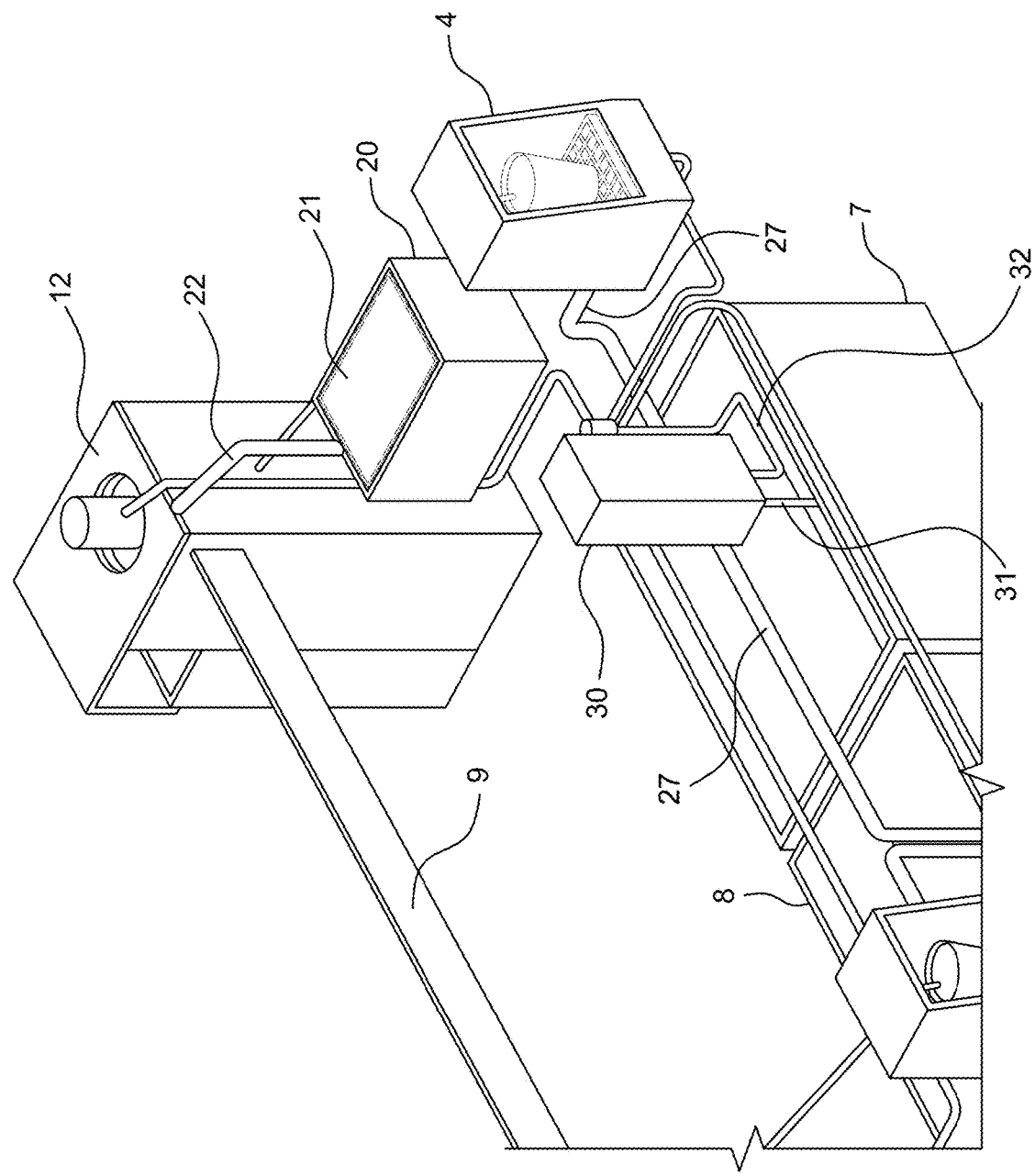
FIG. 6 shows in perspective another rear view detail of the piping circuitry of the device including a speed water heater device adapted to provide a speedy supply of hot water for either boiling selected fruit and/or vegetables or for cleaning the juice or pulp preparing devices and associated piping circuitry thereof and further shows a kettle appliance intermediately between this blender apparatus and a frontal pulp delivery compai linent, wherein the kettle appliance is depicted with the colander thereof immersed within the same.
Figure 7:
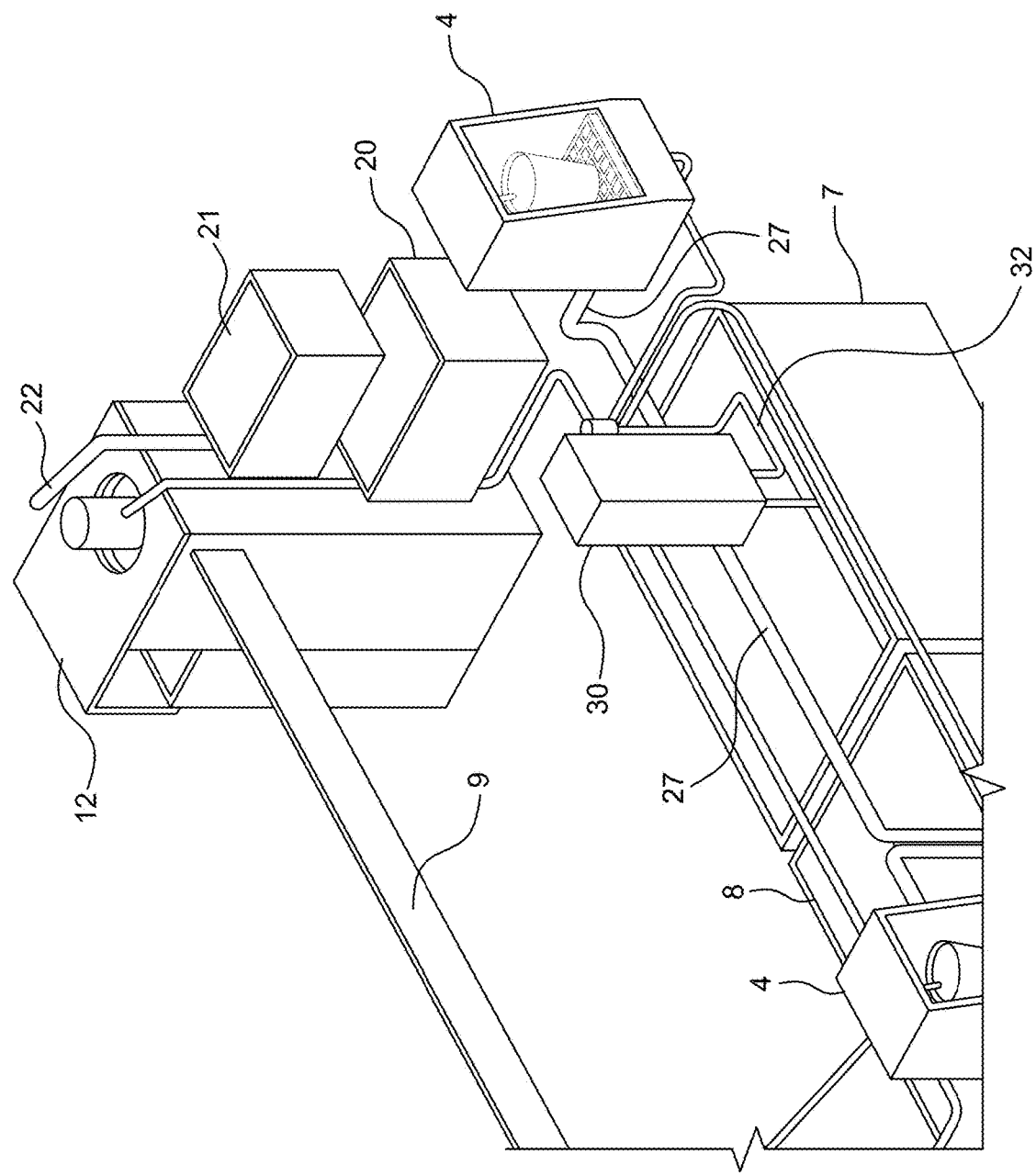
FIG. 7 shows in perspective the detailed view of FIG. 6 wherein the kettle appliance is depicted with the colander thereof raised upwardly.

The device is advantageously provided with means for cooking a selected mix of fruit or vegetable species. In this respect a kettle 20 is provided at one side of the showcase 2 with a colander 21, i.e. a perforated bowl used to immerse a selected mix of fruits/vegetables within the kettle 20 and remove the same ensuring straining off liquid after cooking, wherein the colander 21 is provided with a handle 22 extending beyond the kettle 20. In accordance with the invention when a mix of fruit and/or vegetables is desired to be cooked, the colander 21 is filled with such selected mix of fruit and/or vegetables and is immersed into the kettle 20 wherein this mix is being cooked at a selected level, thereafter the colander 21 being raised through the handle 22 to provide servings of this selected mix of fruit and/or vegetables. FIGS. 6 and 7 respectively show the colander 21 within the kettle 20 while cooking is performed and raised upwardly following termination of the cooking process, whereby in accordance with customer requirements the attendant waiter/waitress proceeds to either serve particles of the selected mix of fruit and/or vegetables or proceed to a further step of processing the same within a juicer or blender appliance to provide a juice or pulp of the same.

In accordance with a preferred embodiment of the invention the space within the showcase 2 is refrigerated by means of an appropriate compressor equipment of a refrigerator appliance accommodated underneath the same, within a compartment 6 of the housing 1.

Whilst a frontal facade of the showcase 2 is closed, the rear view thereof is provided with a gate that operates, either in a sliding or a hinged rotatable mode, to provide access to the interior compartment of fruits and vegetables.

In accordance with another embodiment the space within the showcase 2 may be divided in discreet compartments that contain different species of fruits or vegetables, each compartment separated from adjacent compartments by means of partitions made from transparent material. Each compartment may preferably be provided with its own gate of a hinged rotatable mode adapted to provide access to the specific different species of fruits or vegetables contained in this compartment. In a refrigerated mode of the showcase interior, it is evident that such division into separate compartments would minimize the adverse effect on the temperature at which the interior of the showcase is being maintained of a repetitive opening of the interior to attain fruits/vegetables contained therein.

In accordance with a preferred embodiment of the invention, the device is provided with means of inspection and monitoring of the state of the fruits and vegetables contained within the interior of the showcase 2. In accordance with an illustrative embodiment such inspection and monitoring means is an arrangement of sensor devices 5 appropriately mounted onto a top side of the showcase 2, such sensor devices 5 being adapted to sequentially scan the fruit and vegetable content of the showcase interior with a scope of locating unexpected deformities in a specific fruit or vegetable if any, wherein such deformities may be due to the specific fruit or vegetable being marked or rotten, thereby emitting an alert to direct removal of this fruit or vegetable of inferior quality.

Figure 2:
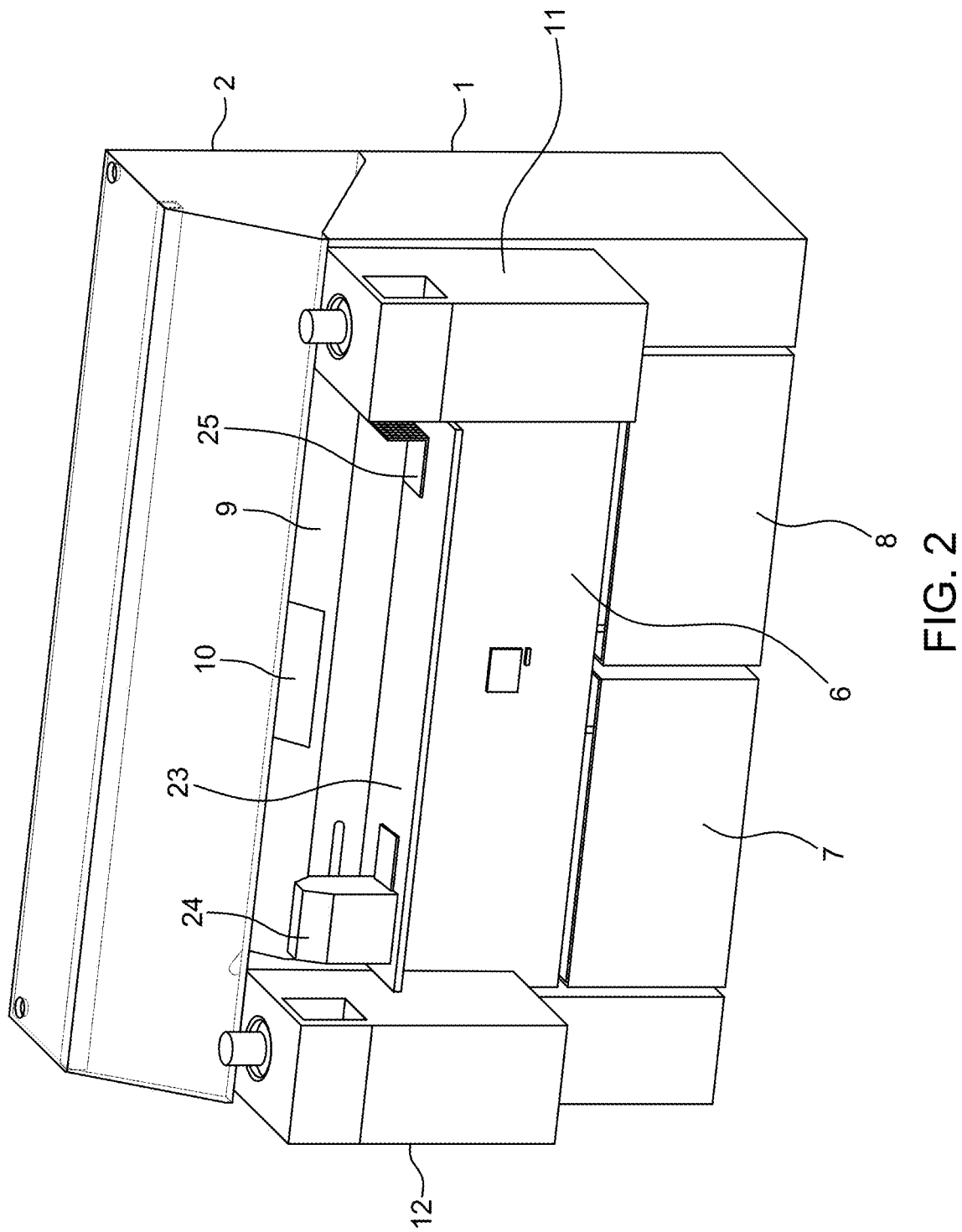
FIG. 2 shows in perspective a rear view of the device depicted in FIG. 1.

The rear view of the device that is depicted in FIG. 2 shows the compartment 6 that lies underneath the showcase 2 and accommodates operational elements (not depicted) of the device including a compressor unit adapted to provide a cooled/refrigerated environment in the interior of the showcase 2 and electromechanical equipment related to operation of automations of the device of the invention including the circuitry associated with cleaning of the fruit/vegetable juice or pulp appliances and piping thereof. The same compressor unit that provides cooling can be employed to produce ice cubes that can be used to serve ice cold juices or pulps or fruit punches, etc. in accordance with customer requirements.

A control panel 10 with appropriately arranged buttons of operation of the operational elements and appliances of the device is located onto a strip 9 that extends longitudinally along the top of the aforementioned compartment 6.

A bench extension 23 is provided underneath the abovementioned strip 9 and an unpeeling device 24 and cutting device 25 are mounted onto this bench extension 23, such unpeeling device 24 and/or cutting device 25 being used to respectively unpeel and cut selected fruit or vegetable when a fruit and or vegetable salad mix is ordered.

Figure 3:
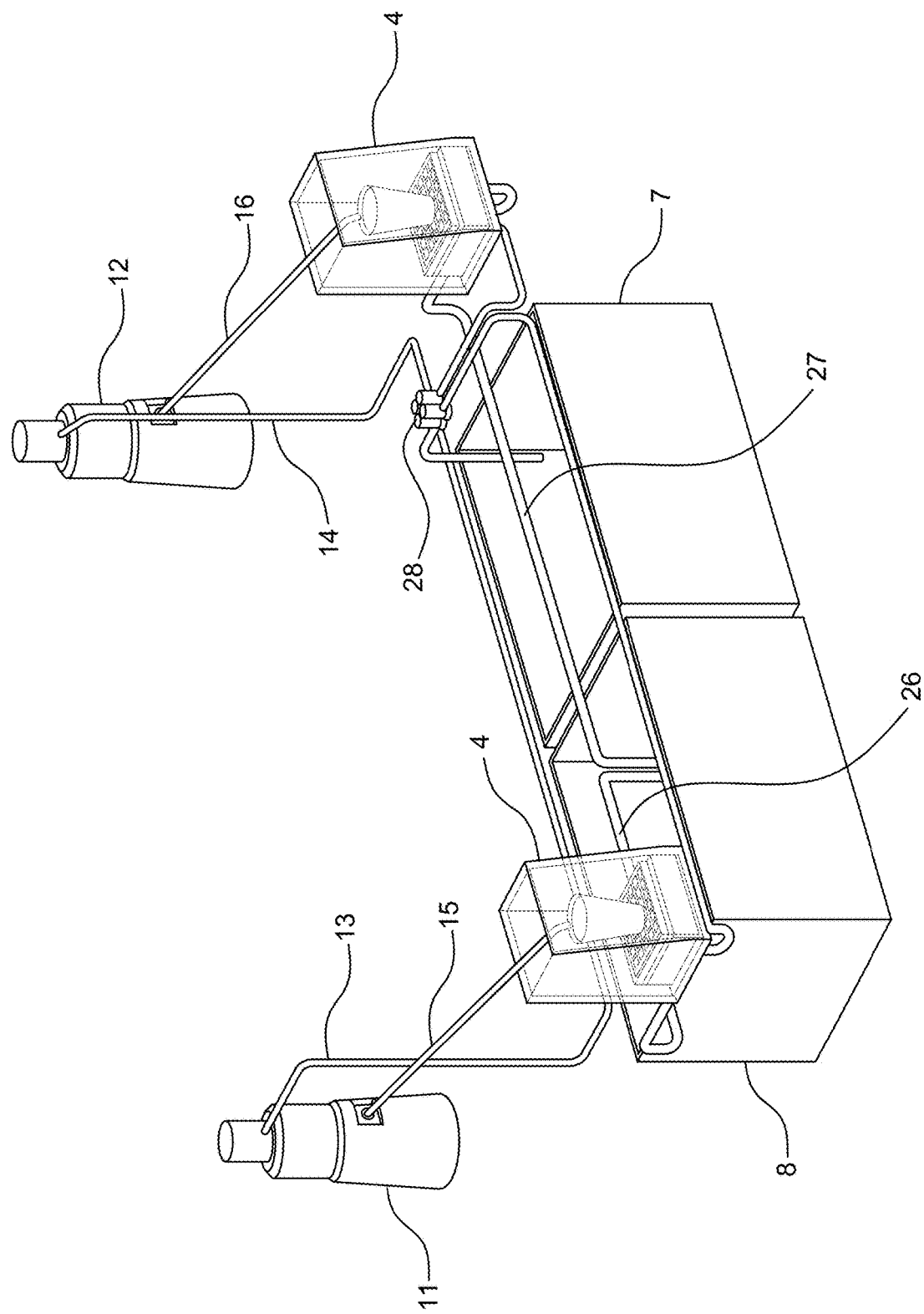
FIG. 3 shows in perspective a frontal view of a detail of the circuitry of the device adapted to deliver fruit and/or vegetable juice or pulp products within containers mounted onto a perforated base plate of appropriately configured juice/pulp delivery compartments and of the circuitry provided for the supply of cleaning water into the juicer and blender appliances of the device.

A pair of compartments 7 and 8 is located underneath the abovementioned compartment 6, these compartments being depicted in FIG. 3 and subsequent Figures without the overlying compartment 6.

A fruit/vegetable juicer appliance 11 is provided at an outwardly projecting orientation at one side of compartment 6 at the rear of the device and a fruit/vegetable blender appliance 12 is provided also at an outwardly projecting orientation at the other side of compartment 6 at the rear of the device. As shown in FIG. 3, piping 13 and 14 is respectively driven at the top of the juicer appliance 11 and the blender appliance 12 to deliver therein cleaning water through the pump 28, whilst a downwardly inclined pipe member 15 and 16 is respectively provided at the juicer appliance 11 and the blender appliance 12 to deliver fruit/vegetable juice and pulp product respectively into a container 19 located in the fruit/vegetable product delivery compartment 4 that is located at the facade of the device of the invention.

In order to achieve optimum hygiene standards of the device of the invention the fruit/vegetable product delivery compartment 4 shown in FIGS. 8a, 8b is hermetically closed by a frontal gate 18 and is adapted to receive a glass or cup or other container 19 wherein the deliverable product is being served, such glass or cup or other container 19 being mounted onto a perforated base plate 17 that is adapted to slide outwardly to provide a serving of the fruit/vegetable juice or pulp product as soon as the frontal gate 18 opens and to slide inwardly as soon as the glass or cup or other container 19 filled with the juice or pulp product has been withdrawn by the customer, wherein the frontal gate 18 closes the cabinet as soon as the perforated base plate 17 has been retracted within the compartment 4. A weight detector (not depicted) is provided underneath the base plate 17, the aforementioned weight detector being adapted to detect receipt of a juice or pulp product quantity n accordance with customer's order in the glass or cup or other container 19 mounted onto the base plate 17, thereby providing a signal to stop supply of the product from the juicer or blender appliance respectively and initiate opening of the frontal gate 18 and outwardly sliding of the base plate 17. In turn, the weight detector is further adapted to provide a signal following the removal of the glass or cup or other container 19 by the customer thereby initiating retraction of the base plate 17 and closure of the frontal gate 18.

Depending on the size and configuration of the device of the invention, it may comprise more of the hereinabove specified items, i.e. more juicer appliances 11 and/or more blender appliances 12 with corresponding juice or pulp delivery compartments 4 and/or more unpeeling devices 24 or cutting devices 25, etc. to suit needs of fruit/vegetable products demanded in each particular case.

Figure 4:
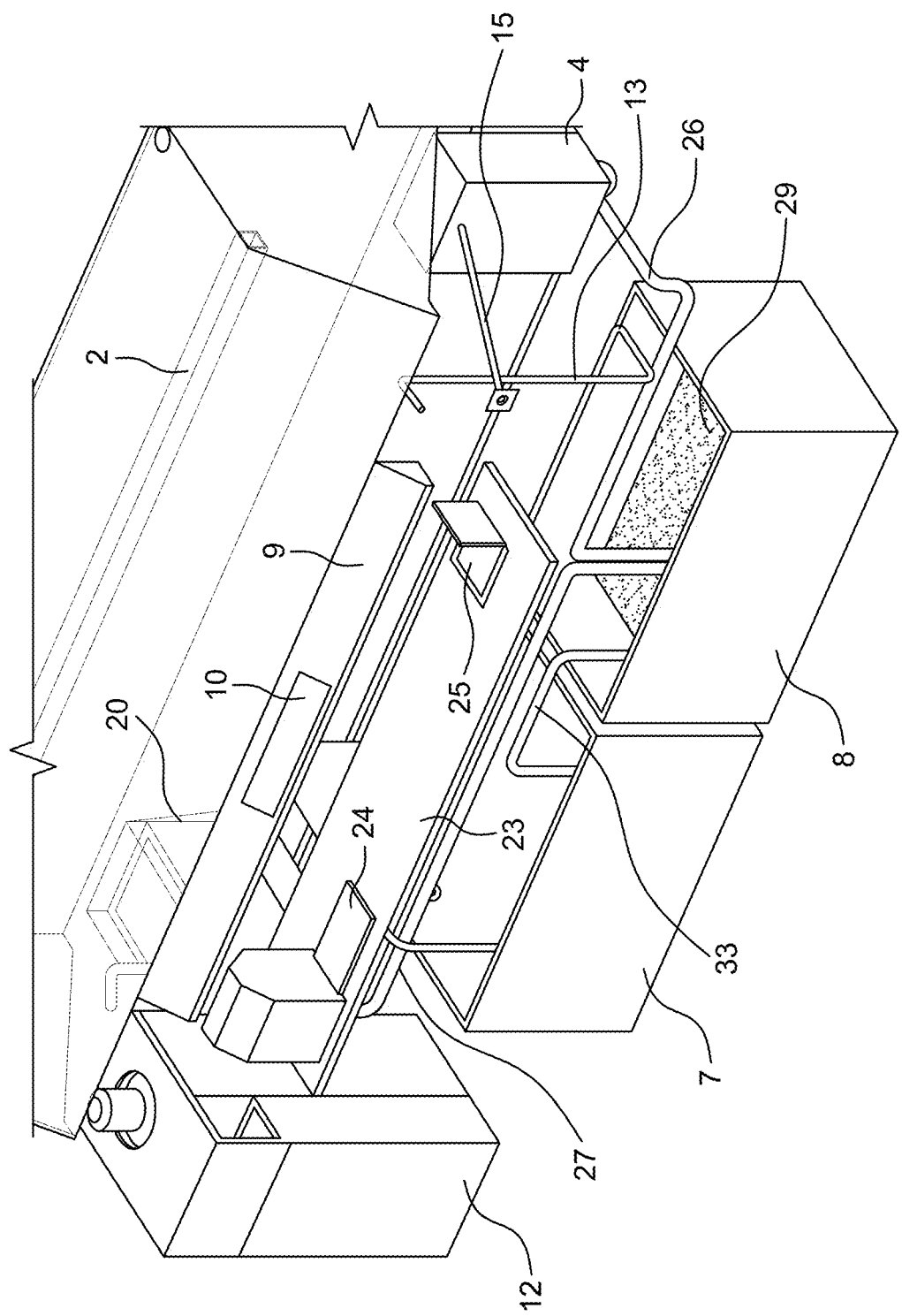
FIG. 4 shows in perspective a partially exploded rear view of the device depicted in FIG. 1.

The compartment 7 of the aforementioned pair of compartments 7, 8 is a container of water that may be used in a cleaning operation of appliances 11, 12 and of the piping used to supply the fruit/vegetable juice and pulp product derived from these appliances into a container 19 being provided within the aforementioned compartments 4 at the frontal section of the device of the invention respectively. The compartment 8 of the aforementioned pair of compartments 7, 8 is a container for the collection of sewerage emanating from operation of the device of the invention. FIG. 4 illustrates the piping used in relation to the aforementioned cleaning and sewerage collection operations.

A cleaning operation of the fruit/vegetable juicer 11 or blender 12 and of the respective piping 15 and 16 thereof that deliver the fruit/vegetable product to the container located within the corresponding compartments 4 is considered an essential process following each fruit/vegetable mix preparation and discharge so as to avert particles remaining from the fruits and vegetables that were processed and odors and/or flavors deriving from this mix adversely affecting the taste of the fruit/vegetable mix to be served next.

Cleaning water thoroughly cleans the interior of the juicer appliance 11 or blender appliance 12, as well as the juice and pulp delivery piping 15 and 16 associated with the same. A cleaning operation is initiated through a command being appropriately given from the control panel 10. As depicted in FIGS. 8*a*, 8*b* the container 19 wherein the fruit/vegetable juice or pulp product is being delivered is mounted onto a perforated base plate 17 and the water that is being used in a cleaning operation and is being delivered through water supply piping 13 and 14, following cleaning of the juicer 11 or the blender 12 respectively, flows through the corresponding piping 15 or piping 16 and cleans this piping as well to eventually flow through the perforated base plate 17 and end up into underlying piping 26 of the compartment 4 for the juicer appliance 11 and underlying piping 27 of the respective compartment 4 for the blender appliance 12, wherein piping 26 and piping 27 are being led into the sewerage collection container of compartment 8.

In accordance with an embodiment of the invention, as shown in FIG. 4, a filter member 29 is provided within the sewerage collection container of compartment 8, such filter member 29 allowing clean water to flow through the same into a lower portion of compartment 8, whilst solid particle remains from the cleaning operation are maintained above the filter member 29 at an upper portion of compartment 8. The water collected within the lower portion of compartment 8 is thereafter being led into the water container compartment 7 by means of an appropriate submersed pump (not shown) through a Π-section piping 33 that comprises one leg immersed within the water contained in compartment 8 and the other leg within the water contained in compartment 7. In this way, water is continuously recycled and used again and again in the aforementioned cleaning operation.

Figure 5:
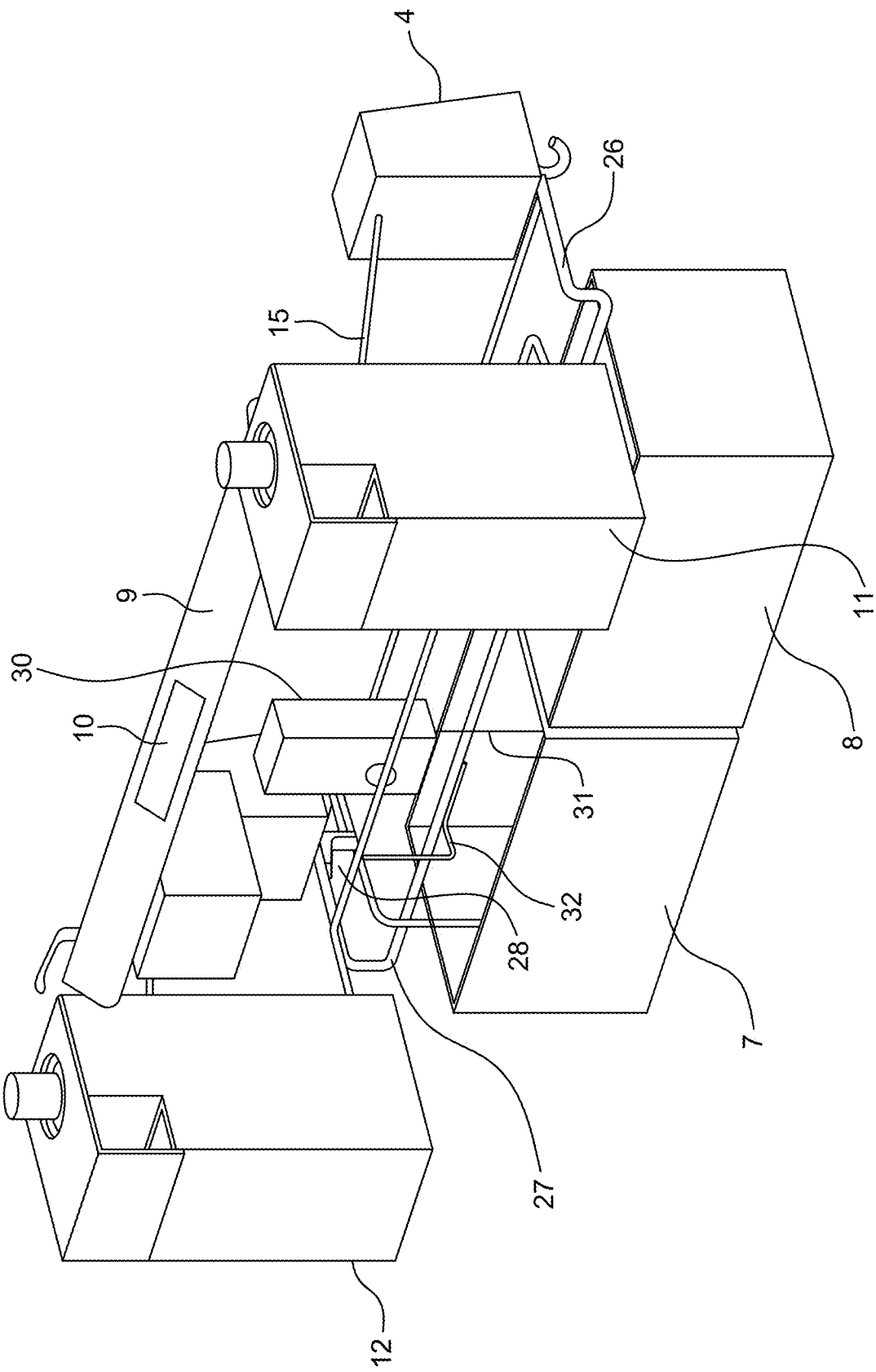
FIG. 5 shows in perspective another rear view of a detail of the piping circuitry of the device by means of which cleaning water is supplied to the juicer and blender appliances and fruit and/or vegetable juice or pulp products are being delivered to the juice/pulp delivery compai linents.

A speed water heater 30 is provided adjacently the kettle 20. The water required for the cooking process of a selected mix of fruit and/or vegetables within the kettle 20, as well as for the aforementioned cleaning operation is provided either directly from the abovementioned first compartment 7 or it may be supplied at an elevated temperature from the speed water heater 30. As shown in FIG. 5 or 6, the speed water heater 30 comprises an inlet duct 31 that is immersed into the water container of compartment 7 and an outlet duct 32. When the speed water heater 30 is used, either for the supply of hot water into the kettle 20 for cooking purposes or for a cleaning operation of the juicer 11 or blender 12 and associated circuitry, cold water is supplied through the inlet duct 31 appropriately equipped with a submersible pump means and water heated at a required temperature is led through the outlet duct 32 to the aforementioned pump 28 to be selectively used in the fruit/vegetable cooking process within kettle 20 or in a cleaning operation of the juicer or blender appliance and associated piping.

The device described hereinabove enjoys standards of operating for an extended period as an autonomous device without connection to water mains or to sewerage networks. The device might also enjoy power autonomy through being provided with its own power source, be it a rechargeable battery or photovoltaic panels or generator or available combinations thereof. However, the device can also operate through connection with available power supply, water and sewerage networks.

While hereinabove the invention has been described by reference to various preferred embodiments, it is to be appreciated that these are for illustrative purposes only and that those skilled in the art will realize that changes and modifications may be made thereto without departing from the spirit of the invention; it is therefore intended to include such changes and modifications falling within the scope of the invention.

The invention claimed is:

1. A device for the delivery of products processed from fruits, vegetables, or fruits and vegetables, said device comprising a housing (1) and a showcase (2) located on top of the housing (1) and made from a transparent material, said showcase (2) accommodating a variety of fruits and vegetables, a compartment (6) within said housing (1) accommodating operational elements of the device including compressor equipment of a refrigerating appliance adapted to provide a cooled environment for said variety of fruits and vegetables within the showcase (2), said device further comprises:

equipment for the preparation of products processed from fruits, vegetables, or fruits and vegetables including:
   at least one juicer appliance (11) and at least one blender appliance (12) for alternatively preparing a juice and a pulp respectively of a selected fruit, vegetable, or fruit and vegetable mix and delivering the same through a first downwardly inclined pipe member (15) from said juicer appliance (11) and through a second downwardly inclined pipe member (16) from said blender appliance (12) into a container (19) located within a juice or pulp product delivery compartment (4) respectively;
   a kettle (20) with a colander (21) adapted to receive a selected fruit, vegetable, or fruit and vegetable mix, said colander (21) immersed within said kettle (20) adapted to cook said mix with a scope of enhancement of a nutritional value thereof;
   at least one unpeeling device (24) and at least one cutting device (25) adapted to unpeel and cut a selected fruit, vegetable, or fruit and vegetable mix for preparing salad or compost servings thereof;
   equipment for autonomous cleaning of said juicer appliance (11) or said blender appliance (12) and of respective juice and pulp delivery said downwardly inclined first and second pipe members (15) and (16) thereof comprising:
   a compartment (7) of a container with cleaning water;
   a compartment (8) of a container for the collection of sewerage;
   a first water supply piping (13) and a second water supply piping (14) being provided to pump cleaning water through a pump (28) from said compartment (7) to said juicer appliance (11) and said blender appliance (12) respectively and to subsequently lead it through said corresponding downwardly inclined first and second pipe member (15) and (16) thereof into said juice and said pulp product delivery compartment (4);

a first water discharge piping (26) underlying said juice product delivery compartment (4) and a second water discharge piping (27) underlying said pulp product delivery compartment (4) being respectively provided for a discharge of cleaning water flowing out of said juicer delivery compartment (4) of said juicer appliance (11) and out of said pulp delivery compartment (4) of said blender appliance (12) into said compartment (8) of the container for the collection of sewerage.

2. The device for the delivery of products processed from fruits, vegetables, or fruits and vegetables, according to claim 1, wherein said showcase (2) comprises a gate that operates, either in a sliding or a hinged rotatable mode, to provide access to the varier of fruits and vegetables accommodated therein.

3. The device for the delivery of products processed from fruits, vegetables, or fruits and vegetables, according to claim 1, wherein said showcase (2) is divided into a plurality of discreet compartments, partitions of transparent material being provided in between adjacent compartments, each of said compartments accommodating a specific different species of fruits or vegetables and being provided with a gate of a hinged rotatable mode adapted to provide access to said specific different species of fruits or vegetables contained therein.

4. The device for the delivery of products processed from fruits, vegetables, or fruits and vegetables, according to claim 1, wherein said showcase (2) further comprises an arrangement of sensor devices (5) appropriately mounted onto a top side thereof, said sensor devices (5) being adapted to sequentially scan the fruit and vegetables contained in said showcase (2) with a scope of locating deformities in specific fruit or vegetable items, if any, said deformities indicating the specific fruit or vegetable items being marked or rotten, said sensor devices (5) thereafter emitting an alert to direct removal of the specific fruit or vegetable items being marked or rotten.

5. The device for the delivery of products processed from fruits, vegetables, or fruits and vegetables, according to claim 1, wherein said juice or pulp product delivery compartment (4) comprises a perforated base plate (17) adapted to receive a container (19) wherein said juice or pulp product is being served and a frontal gate (18) adapted to hermetically close said compartment (4), said perforated base plate (17) being provided with a weight detector, said weight detector providing a first signal to stop discharge of said juice or pulp product from said juicer appliance (11) or blender appliance (12) respectively after receipt of a predetermined juice or pulp product quantity within the container (19), to open said frontal gate (18) and to cause said perforated base plate (17) to slide outwardly to provide a serving of the fruit/vegetable juice or pulp product and said weight detector providing a second signal as soon as said container (19) is being withdrawn from said perforated base plate (17), whereby said perforated base plate (17) slides inwardly said compartment (4) and said frontal gate (18) closes.

6. The device for the delivery of products processed from fruits, vegetables, or fruits and vegetables, according to claim 1, wherein said compartment (8) of the container for the collection of sewerage comprises a filter member (29) adapted to divide said compartment (8) in a lower portion adapted to receive water flowing through the filter member (29) and an upper portion adapted to withhold above the filter member (29) solid particle remains from a cleaning operation, a section piping (33) comprising one leg immersed within the water contained in said lower portion of compartment (8) and another leg immersed within the water contained in said compartment (7) of the container with cleaning water, a submersible pump being adapted to transfer water through said piping (33) from said compartment (8) to said compartment (7) to provide a fully recycled cleaning operation.

7. The device for the delivery of products processed from fruits, vegetables, or fruits and vegetables, according to claim 1, further comprising a speed water heater (30), said water heater (30) comprising an inlet duct (31) that is immersed into the water container of said compartment (7) and an outlet duct (32), said outlet duct (32) being connected to said pump (28), whereby water heated by said speed water heater (30) is being used either for the supply of hot water into the kettle (20) for cooking purposes or for a cleaning operation of the juicer appliance (11) or of the blender appliance (12) and associated circuitry thereof.

* * * * *